United States Patent [19]

Watanabe

[11] 4,399,892
[45] Aug. 23, 1983

[54] THYRISTOR LEONARD TYPE ELEVATOR CONTROL SYSTEM

[75] Inventor: Eiki Watanabe, Inazawa, Japan

[73] Assignee: Mitsubishi Denki Kabushiki Kaisha, Tokyo, Japan

[21] Appl. No.: 300,978

[22] Filed: Sep. 9, 1981

[30] Foreign Application Priority Data

Sep. 18, 1980 [JP] Japan .................................. 55-129979

[51] Int. Cl.³ ............................................... B66B 5/02
[52] U.S. Cl. ................................................. 187/29 R
[58] Field of Search .......................................... 187/29

[56] References Cited

U.S. PATENT DOCUMENTS

| | | | |
|---|---|---|---|
| 3,610,371 | 10/1971 | Abbott | 187/29 |
| 3,658,156 | 4/1972 | Abbott | 187/29 |
| 4,220,222 | 9/1980 | Kamaike et al. | 187/29 |
| 4,316,097 | 2/1982 | Reynolds | 187/29 X |

FOREIGN PATENT DOCUMENTS 53-32544 of 1978 Japan .
54-54264 of 1979 Japan .

*Primary Examiner*—J. V. Truhe
*Assistant Examiner*—W. E. Duncanson, Jr.
*Attorney, Agent, or Firm*—Wenderoth, Lind & Ponack

[57] ABSTRACT

The disclosed elevator control systems comprises a three-phase AC source and an emergency three-phase AC generator supplying selectively an AC power to a thyristor Leonard type converter connected to a hoist DC motor for driving an elevator car, and a firing control circuit formed of a microcomputer. With the converter connected to the AC source, the microcomputer calculates a firing signal from a command and an actual speed signal for the hoist motor, and an input current to the converter according to a firing program stored in it and delivers the firing signal to the converter to control its firing in the symmetric mode. Upon a suspension of the AC power, a power failure detecting relay drops out to connect the converter to the emergency generator, decrease the command speed signal and cause the microcomputer to calculate similarly a firing signal but by using the decreased command speed signal and another firing program stored in it. The firing of the converter is controlled in the unsymmetric mode according to that firing signal.

5 Claims, 19 Drawing Figures iu

FM FIRING
CONT CKT
34

THYRISTOR LEONARD TYPE ELEVATOR CONTROL SYSTEM

BACKGROUND OF THE INVENTION

This invention relates to a thyristor Leonard type elevator control system and more particularly to such a system for controlling an elevator car operated by an emergency AC generator.

Since emergency Ac generators are generally low in capacity, the may be adopted a measure to travel the elevator car operated by an associated emergency AC generator at a speed less than its rated speed determined when the elevator car is operated by a normal AC source therefor. However, with a speed of a hoist DC motor for the elevator car controlled in accordance with a thyristor Leonard system, only a decrease in command speed for the elevator car causes merely a reduction in power factor of the load but does not result in a decrease in load of the emergency AC generator. This is because the thyristor Leonard system controls a phase of an AC voltage applied thereto to adjust the resulting DC voltage. This has resulted in a direct current remaining unchanged though the DC voltage would be changed. Accordingly a corresponding alternating current remains unchanged and the emergency generator does not vary in capacity or a kilovolt-ampere (which is abbreviated to a "KVA"). On the other hand, the emergency AC generator has encountered the problem in a capacity or a KVA of a load therefor.

It has been hereinbefore proposed to decrease the command speed and simultaneously reduce a voltage provided from a source transformer in order to decrease the command speed. A conventional thyristor Leonard type elevator control system has comprised a three-phase AC source transformer receiving selectively an electric power from a three-phase AC source and an emergency three-phase AC generator, a thyristor converter connected to the three-phase source transformer through a pair of three-phase normally open contactors connected to an end of and a tap on the secondary winding of the source transformer, and a firing control circuit connected to the thyristor converter and also a command speed generator.

Further a power failure detecting relay connected to the thre-phase AC source is normally energized and picked up to connect the source transformer to the AC source and disconnect it from the emergency AC generator while the thyristor converter is applied with the entire secondary voltage across the source transformer through that AC connector connected to the end of the secondary winding thereof and put in its closed position. The firing control circuit controls the firing of thyristor disposed in the thyristor converter in response to a command speed signal from the command speed generator. Accordingly the thyristor converter drives an associated hoist DC motor at a speed as determined by the command speed signal resulting in a mating elevator car traveling at its rated speed.

Upon the occurrence of a power failure, the power failure detecting relay drops out to disconnect the source transformer from the AC source and connect it to the emergency AC generator while the thyristor converter receives an intermediate voltage from the source transformer through the remaining AC contactor put in its closed position with the one AC contactor returned back to its open position. At the same time, the command speed generator applies to the firing control circuit another command speed signal less in magnitude than that described above. This is because a set of contacts controlled by the power failure detecting relay is put in its closed position to connect a Zener diode to the output of the command speed generator to permit the Zener diode to clip the command speed signal. As a result, the elevator car travels at a speed less than its rated speed.

Since the source transformer changes in transformation ratio to adjust a DC voltage applied across the armature of the hoist motor as described above, the above-mentioned conventional elevator control system has increased in power factor and the emergency AC generator has decreased in capacity or KVA and been easily operated.

Such a control system, however, has been disadvantageous in that an associated control board is expensive and large-size because a pair of three-phase AC contactors are required to be connected to the source transformer to change a transformation ratio thereof.

When arranged in a thyristor Leonard circuit configuration, the thyristor converter produces a DC output voltage controlled by changing the firing phase of thyristors disposed therein. Therefore an alternating current applied to the thyristor converter lags in phase behind an associated AC voltage resulting in the generation of a high reactive power. As the lower the DC output voltage the higher the reactive power and the lower the power factor thereof will be.

The thyristor Leonard circuit configuration may comprise first three pairs of serially connected thyristors connected together in anti-parallel circuit relationship to second three pairs of serially connected thyristors. Each of the first three thyristor pairs includes the junction of the two thyristor connected to a different one of three-phase conductors subsequently connected to a three-phase AC source as does each of the second three thyristor pairs and the first and second three thyristor pairs are connected across a load, in this case, the hoist DC motor.

Only either one of the first and second thyristor pairs is used and the three-phase AC source supplies a three-phase electric power to the thyristors in the three pairs through the phase conductors while a firing control circuit effects the phase control of those thyristor. Thus a DC output voltage is generated to drive the DC motor.

In the thyristor Leonard circuit configuration as described above, the firing of the thyristors may be controlled in the symmetric or unsymmetric mode. In the symmetric mode the firing angle of those thyristors having anode electrodes connected to the respective phase conductors or the thyristors on the positive side is equal to that of those thyristors having cathode electrodes connected to the respective phase conductors or the thyristor on the negative side with a null DC output voltage. This has resulted in a long duration of a phase current through each thyristor and and therefore an increase in reactive power. In the unsymmetric mode, however, the firing angles of the thyristor on the positive and negative sides may approximate electrical angles of 0° and 180° degrees of the system respectively with a null DC output voltage. Under these circumstances, the two serially connected thyristor in each pair are simultaneously fired for a relatively long time to shortcircuit the DC side. This has resulted in a reduction in duration of a phase current through each thyristor. Thus the reactive power is decreased accordingly.

Therefore the firing control in the unsymmetric mode is advantageous in that the reactive power decreases and the resulting power factor is improved but disadvantageous in that, with the DC output voltages in excess of a certain magnitude, the power factor is not improved and the DC output voltage deteriorates in form factor resulting in an increase in noise generated by the DC motor.

In elevator control systems including the thyristor Leonard type converter it has been already proposed to control the firing of the thyristor converter in the unsymmetric mode with DC output voltages of not larger than a certain magnitude from the thyristor converter and change the control of the firing thereof to the symmetric mode with the DC output voltages in excess of the certain magnitude. As the elevator car is frequently repeated to accelerate and decelerate, the control of the firing of the thyristor converter is frequently changed from the symmetric to the unsymmetric mode and vice versa. This has resulted in the generation of shocks though would be for short times and therefore in the deterioration of a comfortable ride in the car.

However if the firing of the converter is controlled in the unsymmetric mode in the case the elevator car travels at a low speed by an associated emergency AC generator then the resulting power factor can be improved. Further noise from the DC motor may be somewhat increased without hindrance in the operation of the emergency generator because the emergency generator is operated for a short time interval and in case of an emergency.

Accordingly it is an object of the present invention to provide a new and improved thyristor Leonard type elevator control system increased in a power factor at low speed of an elevator car involved by changing the control mode of a firing control circuit for a thyristor Leonard type converter during the travel of the elevator by an associated emergency AC generator.

It is another object of the present invention to provide a thyristor Leonard type elevator control system including the firing control circuit as described in the preceding paragraph manufactured cheaply and free from the deterioration of a comfortable ride in an elevator car involved.

SUMMARY OF THE INVENTION

The present invention provides a thyristor Leonard type elevator control system comprising an elevator car, a DC motor for driving the elevator car, a three-phase AC source, a thyristor Leonard type converter normally connected between the three-phase AC source and the DC motor to convert a three-phase AC power from the three-phase AC source to a DC power, an emergency three-phase AC generator for generating a three-phase AC power during a suspension of the three-phase AC power failure, changer means responsive to the failure of the three-phase AC power to change the connection of the thyristor converter from the three-phase AC source to the emergency three-phase AC generator, a command speed generator for generating a command speed signal for the DC motor, command changing means connected to the command speed generator to decrease a magnitude of the command speed signal therefrom in response to the operation of the changer means of connecting the thyristor converter to the emergency three-phase AC generator, and a firing control circuit connected to both the command speed generator and the thyristor converter to control the firing of the thyristor converter in the symmetric mode in response to the command speed signal from the command speed generator when the thyristor converter is connected to the three-phase AC source. When the thyristor converter is connected to the emergency three-phase AC generator through the operation thereof, the changer means is operated to cause the firing control circuit to control the firing of the thyristor converter in the unsymmetric mode in response to the decreased command signal.

The firing control circuit is formed preferably of a microcomputer having stored therein firing programs for the symmetric and unsymmetric control modes with the thyristor converter connected to the AC source, the microcomputer calculates a firing signal from the command speed signal and an actual speed signal for the hoist DC motor and an input current to the thyristor converter according to the firing program for the symmetric control mode and delivers the firing signal to the thyristor converter in synchronization with the AC source to control the firing thereof in the symmetric mode according to the firing signal. However, upon a failure of the AC power the microcomputer calculates similarly a firing signal but by using the decreased command signal and the firing program for the unsymmetric control mode. Thus the firing of the thyristor converter is controlled in the unsymmetric mode according to the last-mentioned firing signal.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
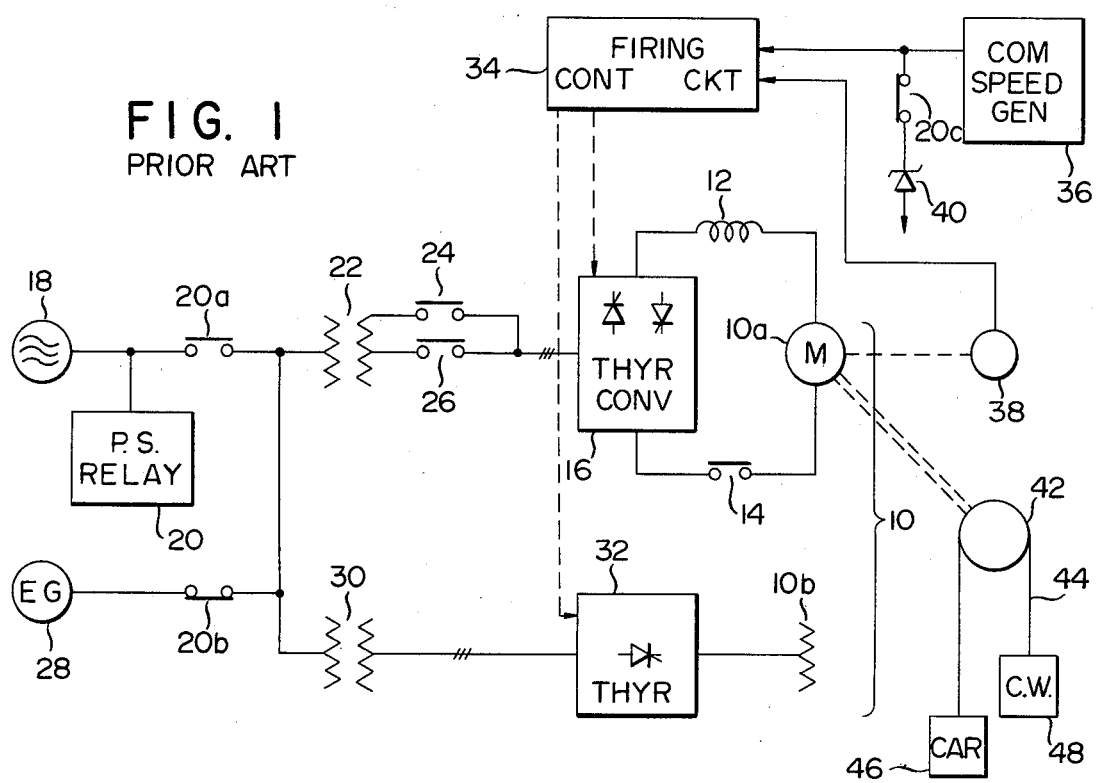
FIG. 1 is a combined block and circuit diagram of a conventional elevator control system illustrated in its operating state in which an emergency AC generator involved serves to drive an associated elevator car.

Referring now to FIG. 1 of the drawings, there is illustrated a conventional elevator control system. The arrangement illustrated comprises a hoist DC electric motor generally designated by the reference numeral 10 including an armature 10a and a field winding 10b, a DC reactor 12 connected to one end of the armature 10a, a DC contactor 14 connected to the other end of the armature 10a and a thyristor converter 16 connected at both ends to the DC reactor and contactor 12 and 14 respectively.

The arrangement comprises further a three-phase AC source 18 connected via a set of contacts 20a shown at its open position to a primary winding of a three-phase AC source transformer 22 including a secondary winding connected to the thyristor converter 16 through a pair of normally open three-phase AC contactors 24 and 26 connected to one end of the secondary transformer 22 winding and a tap thereon respectively.

Also the arrangement comprises an emergency three-phase AC generator 28 connected to both the primary transformer 22 winding and a primary winding of an emergency three-phase transformer 30 through a set of contacts 20b shown in its closed position. The emergency three-phase transformer has a secondary winding connected to the field coils 10b of the DC motor 10 through a field exciting thyristor 32.

As shown in FIG. 1, a power failure detecting relay 20 is connected to the three-phase AC source 18 at the output to be energized and picked up with a three-phase power from the source 18 thereby to put the sets of contacts 20a in its closed position and the set of contacts 20b in its open position. However if the AC source 18 fails to deliver the AC power, then the power failure detecting relay 20 is deenergized and drops out to put the sets of contacts 20a and 20b in their open and closed position respectively as shown in FIG. 1.

In order to fire selectively thyristors disposed in the thyristor converter 16 and the field exciting thyristor 32, a firing control circuit 34 is connected to both the thyristor converter 16 and the field exciting thyristor 32 and applied with a command speed signal from a command speed generator 36. And also an actual speed signal from speed sensor 38 mechanically connected to the armature 10a of the hoist motor 10 to sense a rotational speed thereof. The command speed generator 36 is further connected at the output to ground through a set of contact 20c shown in its closed position in FIG. 1 and a Zener diode 40 connected in series to each other. The set of contacts 20c is normally closed and brought into its open position by the power failure detecting relay 20 energized and picked up.

In addition, the arrangement comprises a sheave 42 mechanically connected to the armature 10a of the hoist motor 10 and a length of rope 44 trained over the sheave 42 and including an elevator car 46 connected to one end thereof and a counter weight 48 connected to the other end thereof.

In normal operation or in the presence of the AC power supplied by the three-phase AC source 18, the power failure detecting relay 20 is picked up to close the set of normally open contacts 20a while opening the set of normally closed contacts 20b ensuring that an AC power from the emergency generator 28 is prevented from being supplied to the two transformers 22 and 30. Further the set of normally closed contacts 20c is in its open position to disconnect the Zener diode 40 from the command speed generator 36. Also the three-phase AC contactor 24 is put in its closed position by a control circuit (not shown). As a result, the hoist motor 10 is driven under the control of the thyristor converter 16 and the field exciting thyristor 32 which are, in turn, controlled by the firing control circuit 34 in accordance with the command speed signal from the command speed generator 36. Therefore the motor 10 is operated to travel the elevator car 46 at its rated speed in the up or down direction as the case may be.

If the three-phase AC source 18 suspends the power supply for some reason then the power failure detecting relay 20 drops out to open the set of closed contacts 20a and put the sets of open contacts 20b and 20c in their closed position. Thus the emergency three-phase AC generator 28 supplies an AC power to the two transformers 22 and 30. Also the three-phase AC contactors 24 and 26 are put in their open and closed positions respectively by the control circuit (not shown). Simultaneously, the Zener diode 40 clips the command speed signal from the command speed generator 36 because of the closure of the contact set 20c. This results in the elevator car traveling at a speed less than the rated speed.

In the arrangement of FIG. 1 it is seen that the source transformer 22 is arranged to change in transformation ratio to control a voltage supplied across the armature 10a of the hoist motor 10. Therefore the arrangement of FIG. 1 has been advantageous in that the source transformer 22 increases in power factor and decreases in capacity or KVA with the result that the emergency AC generator 28 can be easily operated.

However the control as described above has required the use of pair of three-phase AC contactors 24 and 26 connected to the secondary winding of the source transformer 22 for the purposes of changing the transformation ratio. This has resulted in the disadvantages in that an associated control board increases in both cost and size.

The present invention contemplates to eliminate the disadvantages of the prior art practice as described above by the provision of a thyristor Leonard type elevator control system including means for improving the power factor thereof at low speeds of an associated elevator car by changing the control mode in which the firing of a thyristor Leonard type converter involved is controlled, during the low speed travel of the elevator car by an associated emergency AC generator.

In thyristor converter arranged in the thyristor Leonard circuit configuration, the DC output voltage therefrom are controlled by changing the firing phase of thyristor disposed therein and therefore the alternating current therethrough has a phase lagging behind that of the associated alternating voltage thereacross. Therefore the resulting reactive power becomes high. The less the DC output voltage the higher the reactive power will be. As a result, the power factor is also lowered.

Figure 2:
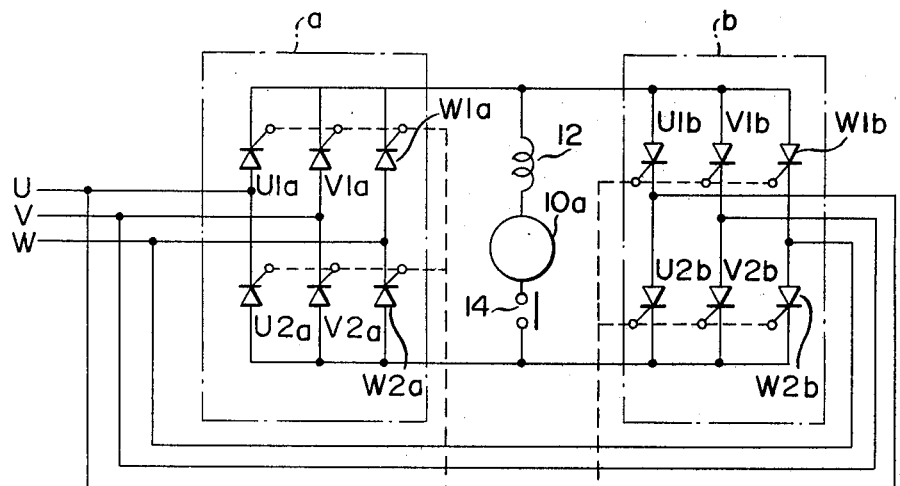
FIG. 2 is a circuit diagram of a three-phase thyristor Leonard type converter in which the present invention is interested.

FIG. 2 illustrates a thyristor Leonard circuit configuration in which the present invention is interested. In the arrangement illustrated first three pairs of serially connected thyristor U1a and U2a, V1a and V2a and W1a and W2a are connected in anti-parallel circuit relationship to second three pairs of serially connected thyristors U1b and U2b, V1b and V2b and W1b and W2b. Each of the first three thyristor pairs includes the junction of the two serially connected thyristor connected to a different one of three phase conductors U, V and W respectively as does each of the second three thyristor pairs. For example, the phase conductor U is connected to the junction of the thyristors U1a and U2a and that of the thyristors U1b and U2b.

Then the first and second thyristor pairs are connected across a load including a DC reactor 12, an armature 10a of a hoist motor and a DC contactor 14 serially interconnected such as shown in FIG. 1 and gate electrodes of all the thyristors are connected to a firing control circuit 34 such as shown also in FIG. 1.

Thus the first and second thyristor pairs form a first and a second converter a and b respectively. The arrangement of FIG. 2 is called a dual converter without a cross current and only one of the converters a or b is used.

As the first and second converters a and b respectively are identical in operation to each other, one of them, for example, the first converter a will now be described.

The three-phase AC source (not shown) supplies an electric power in each phase U, V or W to the first converter a through an associated one of the phase conductors U, V and W while the firing control circuit a produces a DC output voltage to drive the armature 10a and therefore an associated motor such as the hoist motor 10 shown in FIG. 1.

Figure 3A:
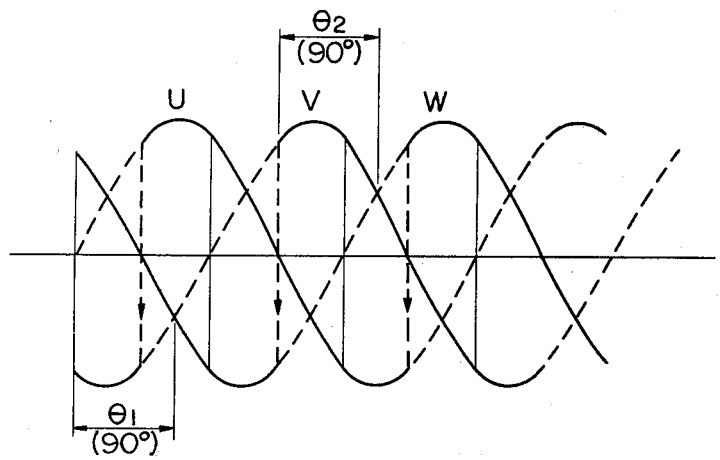
FIGS. 3A, 3B and 3C are graphs useful in explaining the operation of the arrangement as shown in FIG. 2 controlled in the so-called symmetric mode.
Figure 3B:
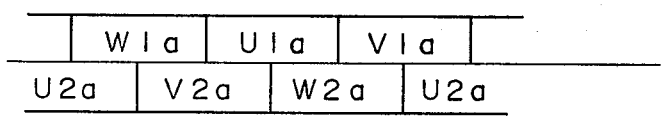
Figure 3C:
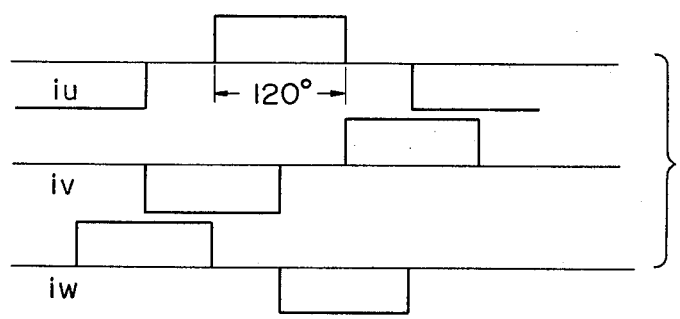

It is now assumed that the thyristors U1a, V1a and W1a have the firing angle or controlled leading angle $\theta_1$ while the thyristors U2a, V2a, and W2a and the firing angle $\theta_2$. Under the assumed conditions, the firing control 34 has previously controlled the firing phase of both the thyristors U1a, V1a and W1a having anode electrodes connected to the phase conductors U, V and W respectively, that is, disposed on the positive side and the thyristors U2a, V2a and W2a having cathode electrodes connected to the phase conductors U, V and W, that is, disposed on the negative side by setting the firing angles $\theta_1$ and $\theta_2$ to be equal to each other and electrical angles of 90 degrees of the system in the case the converter produces, for example, a null DC output voltage. This is shown in FIG. 3A wherein there is illustrated the relationship between each phase voltage also designated by the reference character U, V or W and the firing angles $\theta_1$ and $\theta_2$ of the associated thyristors. Under these circumstances, the thyristors are successively put in their fired state as shown in FIG. 3B wherein rectangles labelled U1a, V1a, W1a, U2a, V2a and W2a indicate time intervals for which those thyristors designated by the same reference characters as the rectangles are being fired. For each of the firing angles $\theta_1$ or $\theta_2$ having the magnitude as specified above, phase currents $i_u$, $i_v$ and $i_w$ flow through the phase conductor U, V and W and therefore the associated thyristors for long time intervals corresponding to an electrical angle of 120 degrees of the system respectively as shown in FIG. 3C. This has resulted in an increase in reactive current, and accordingly a decrease in power factor.

Figure 4A:
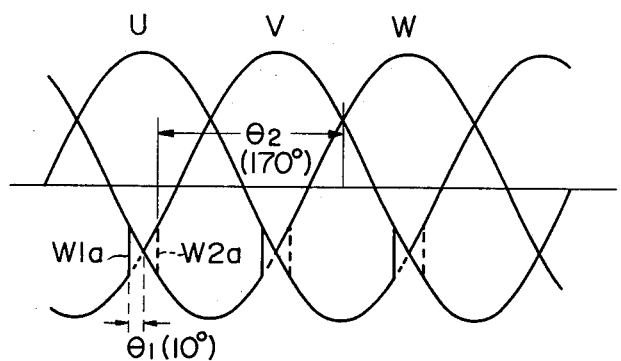
FIGS. 4A, 4B, 4C, 4D, FIG. 5 and FIGS. 6A, 6B and 6C are graphs useful in explaining the operation of the arrangement as shown in FIG. 2 controlled in the so-called unsymmetric mode.
Figure 4B:
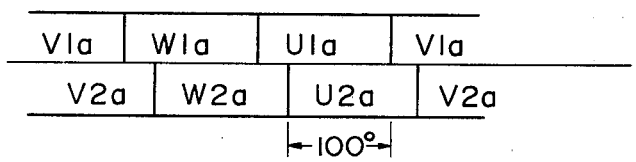
Figure 4C:
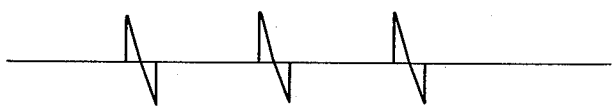
Figure 4D:
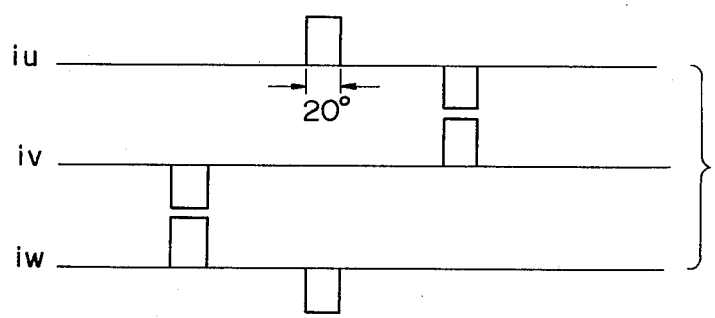

FIGS. 3A, 3B and 3C illustrate a firing control process called a "symmetric mode". On the other hand, there is known a firing control system called an "unsymmetric mode" which is illustrated in FIG. 4 wherein FIGS. 4A, 4B and 4D are graphs similar to FIGS. 3A, 3B and 3C respectively and FIG. 4C shows a waveform of a DC output voltage.

Assuming in FIG. 4 that the DC output voltage equal to a null megnitude, the firing angles $\theta_1$ and $\theta_2$ are made to approximate electrical angles of 0 and 180 degrees of the system respectively. In the example illustrated the firing angles $\theta_1$ and $\theta_2$ are of 10 and 170 degrees in terms of the electrical angle of the system respectively as shown in FIG. 4A. For the firing angles of such magnitudes, the pair of serially connected thyristors U1a and U2a, V1a and V2a or W1a and W2a in each phase are simultaneously put in their fired state for a predetermined time period, in this case, through an electrical angle of 100 degrees of the system as shown in FIG. 4B whereby that pair of now fired thyristors shortcircuit the DC side. This has resulted in a reduction in time interval for which each current flows through the associated phase conductor U, V or W as illustrated in FIG. 4D. In FIG. 4D a current $i_u$, $i_v$ or $i_w$ is shown as flowing through the associated phase conductor U, V or W for a time period corresponding to an electrical angle of 20 degrees of the system. Therefore a reactive power is decreased correspondingly. For the duration of the phase current $i_u$, $i_v$ or $i_w$ a DC output voltage $E_o$ is produced as shown in FIG. 4C and may be expressed by $$E_o = \frac{3\sqrt{2}\, E_a}{2\pi} \int_{-\theta_1}^{\pi - \theta_2} (-\sin\theta)d\theta \qquad (1)$$

$$= \frac{3\sqrt{2}\, E_a}{2\pi} \{\cos(\pi - \theta_2) - \cos\theta_1\}$$

where $E_a$ designate an AC voltage across an associated three-phase AC source (not shown).

Figure 5:
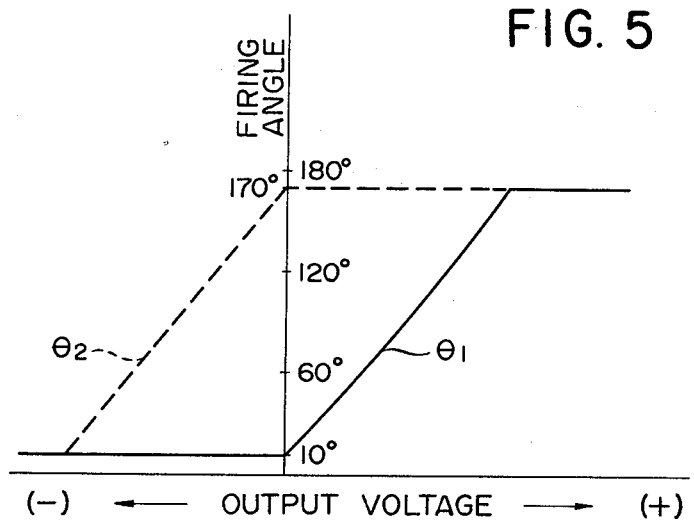

Assuming that the firing angle $\theta_1$ has a minimum magnitude $\theta_{1min}$ of about 10 degrees and the firing angle $\theta_2$ has a maximum magnitude $\theta_{2max}$ of about 170 degrees in terms of the electrical angle of the system, the firing angle is controlled as shown in FIG. 5 wherein the axis of ordinates represents the firing angle $\theta_1$ or $\theta_2$ and the axis of abscissas represents the DC output voltage. With the firing angle $\theta_2$ held constant or where $\theta_2 = 170°$ holds, the firing angle $\theta_1$ can increase from the electrical angle of 10 degrees of the system to output a positive voltage as shown at solid line labelled $\theta_1$ in FIG. 5 until it reaches a maximum magnitude which is calculated at $1.35 E_a$ from the expression (1). On the other hand, where $\theta_1 = 10°$ holds, the firing angle $\theta_2$ can decrease from the electrical angle of 170 degrees of the system to output a negative voltage as shown at dotted line labelled $\theta_2$ in FIG. 5.

Figure 6A:
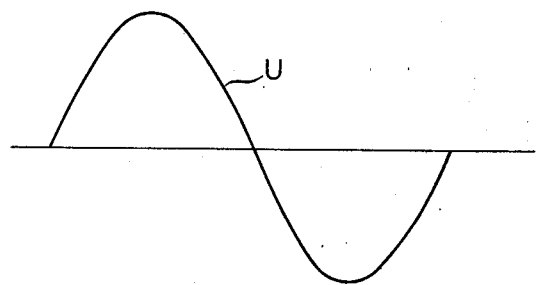
Figure 6B:
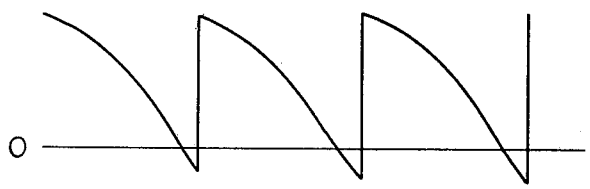
Figure 6C:
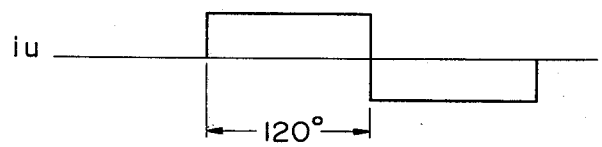

From the foregoing it is seen that the firing control in the unsymmetric mode can decrease the reactive power and improve the power factor. However the unsymmetric control mode of the firing control has been disadvantageous in the following respects:

First the effect of improving the power factor disappears at and above a certain magnitude of the DC output voltage which will now be described briefly in conjunction with the phase U and with respect to FIGS. 6A, 6B and 6C on the assumption that $\theta_1 = 110°$ and 170 hold and a positive voltage is produced. FIG. 6A shows an AC voltage waveform in the phase U, FIG. 6B shows a waveform of a DC output voltage resulting from the phase voltage illustrated in FIGS. 6A and FIG. 6C shows a waveform of a U phase current $i_u$. From FIGS. 6B and 6C it is understood that, as the DC output voltage becomes high, the phase current $i_u$ increases in duration until the duration thereof reaches an electrical angle of 120 degreees of the system as shown in FIG. 6C. This figure is equal to that obtained with the conventional firing control in the symmetric mode as shown in FIGS. 3A, 3B and 3C. At that time the DC output voltage $E_o$ is calculated at $0.896 E_a$ from the expression (1) and has a magnitude equal to two thirds the maximum magnitude thereof. Also the DC output voltage deteriorates in form factor. This has resulted in an increase in noise generated from an associated DC motor.

Secondarily low order harmonics of even numbers are developed on the AC side. In the six-phase thyristor bridge as shown in FIG. 2 controlled in the symmetric mode as shown in FIG. 3, a $(6n\pm1)$th harmonic is developed on the AC side where $n=1, 2, \ldots$. That is, a fifth, seventh, an eleventh, a thirteenth, ... harmonics are developed. In the unsymmetric mode as shown FIG. 4, however, even order harmonics such as second, fourth, eighth, ... harmonics are developed, in addition to the abovementioned harnomics on the AC side and adversely affect the source side.

Figure 7A:
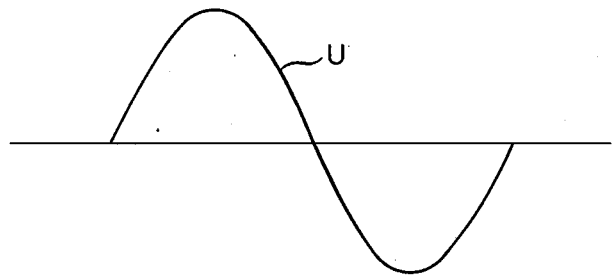
FIGS. 7A, 7B, 7C, 7D and 7E are graph useful in explaining ranges available by the controls in the symmetric and unsymmetric modes respectively in the case the arrangement shown in FIG. 2 is controlled in either of the symmetric and unsymmetric modes.
Figure 7B:
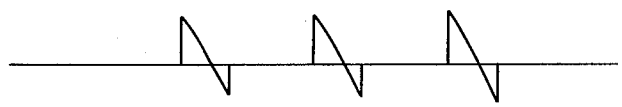
Figure 7C:
Figure 7D:
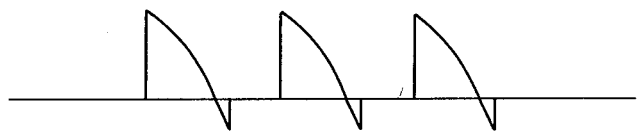
Figure 7E:
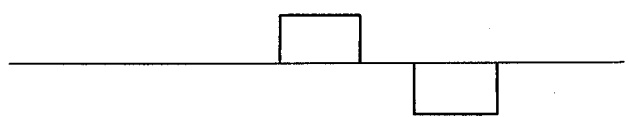

The description will now be made in conjunction with how the firing control in the unsymmetric mode changes the woveform factor of the DC output voltage and with reference to FIG. 7 wherein there are illustrated various waveforms developed during the generation of positive voltages. FIG. 7A is a replica of FIG. 6A, and FIGS. 7B and 7C are similar to FIGS. 6B and 6C respectively but illustrating $\theta_1=30°$ and $\theta_2=170°$. FIGS. 7D and 7E are similar to FIGS. 6B and 6C respectively but illustrating $\theta_1=60°$ and $\theta_2=170°$. The DC output voltages shown in FIGS. 7B and 7D have magnitudes $E_o$ equal to $0.08E_a$ and $0.327E_a$ respectively.

The waveform factor of the DC output voltage is defined by a ratio of its effective magnitude $E_e$ to its output voltage $E_o$ and the effective magnitude $E_e$ may be expressed by $$E_e = \sqrt{2E_a}\sqrt{\frac{3}{2\pi}\int_{-\theta_1}^{\pi-\theta_2}(-\sin\theta)^2\cos\theta d\theta} \quad (2)$$

Since $\theta_1=130°$ and $\lambda\theta_2=170°$ hold in FIG. 7B, $$E_e=0.212E_a \quad (3)$$

results. Therefore the waveform factor is of 2.65.

On the other hand, the firing control in the symmetric mode has each of the firing angles $\theta_1$ or $\theta_2$ equal to an electrical angle of 93.45 degrees of the system for the DC output voltage of $0.08E_a$. At that time $$E_e=0.423E_a \quad (4)$$

yields. This results in a waveform factor of 5.3.

From the foregoing it will readily be understood that the firing control in the unsymmetric mode improves the waveform factor with low output voltages.

In FIG. 7D, by substituting $\theta_1=60°$ and $\theta_2=170°$ into the expression (2), $$E_e=0.543E_a \quad (5)$$

is obtained. This results in a waveform factor of 1.66.

In the firing control in the symmetric mode, however, each of the firing angles $\theta_1$ or $\theta_2$ is of 104 degrees in terms of the electrical angle of the system for $E_o=0.527E_a$. Accordingly, the effective voltage $E_e$ is of $$0.505E_a \quad (6)$$

Therefore the waveform factor results in 1.555.

Also waveforms developed during the generation of negative voltages are substantially similar to those developed during the generation of the positive voltages as described above.

From the foregoing, it is concluded that, as compared with the symmetric mode, the unsymmetric mode of the firing control improves the power factor and waveform factor of the DC output voltage up to $|E_o|=0.3E_a$ and also has a good power factor but a poor waveform factor with $|E_o|$ ranging from $0.3E_a$ to $0.896E_a$. With $|E_o|$ exceeding $0.896E_a$, the unsymmetric mode is equal in power factor and inferior in waveform factor to the symmetric mode.

As the waveform factor of the output voltage affects noise generated by associated electric motors, it has been already proposed, in the elevator control systems employing the firing control in the unsymmetric mode as described above in conjunction with FIG. 4, to effect the unsymmetric firing control for $|E_o|$ of not greater than $0.3E_a$ and change the same to the conventional symmetric firing control as described above in conjunction with FIG. 3 for $|E_o|$ in excess of $0.3E_a$. However, in the operation of elevator systems, accelerations and decelerations are frequently repeated thereby to change frequently the unsymmetric to the symmetric control and vice versa. This frequent change of one to the other of the unsymmetric and symmetric controls has caused shocks although they would be of short time intervals and resulted in the deterioration of a confortable ride in an associated elevator car.

However, when an elevator car travels at a low speed by an emergency generator therefor, the control of the firing of the thyristor involved in the unsymmetric mode can improve the power factor and also omit the tap changing contactors 24 and 26 shown in FIG. 1. Furthermore as the operation by the emergency generator is performed in case of an emergency and for a short time interval, noise from an associated hoist electric motor is permitted to be somewhat higher without hindrance. As a result, the firing control in the unsymmetric mode can be put to practical use up to $|E_o|=0.896E_a$ without the necessity of changing the unsymmetric to the symmetric mode during the travel of the elevator car.

With the abovementioned respects in view, the present invention contemplates to provide a thyristor Leonard type elevator control system arranged to decrease a command speed signal upon the elevator car traveling by an emergency generator involved while at the same time changing the symmetric mode of the firing control to the unsymmetric mode thereof to improve a power factor of a thyristor Leonard system. Further a microcomputer is utilized to change the symmetric to the unsymmetric mode of the firing control thereby to provide an unexpensive elevator control system without a confortable ride in the elevator car deteriorated.

Figure 8:
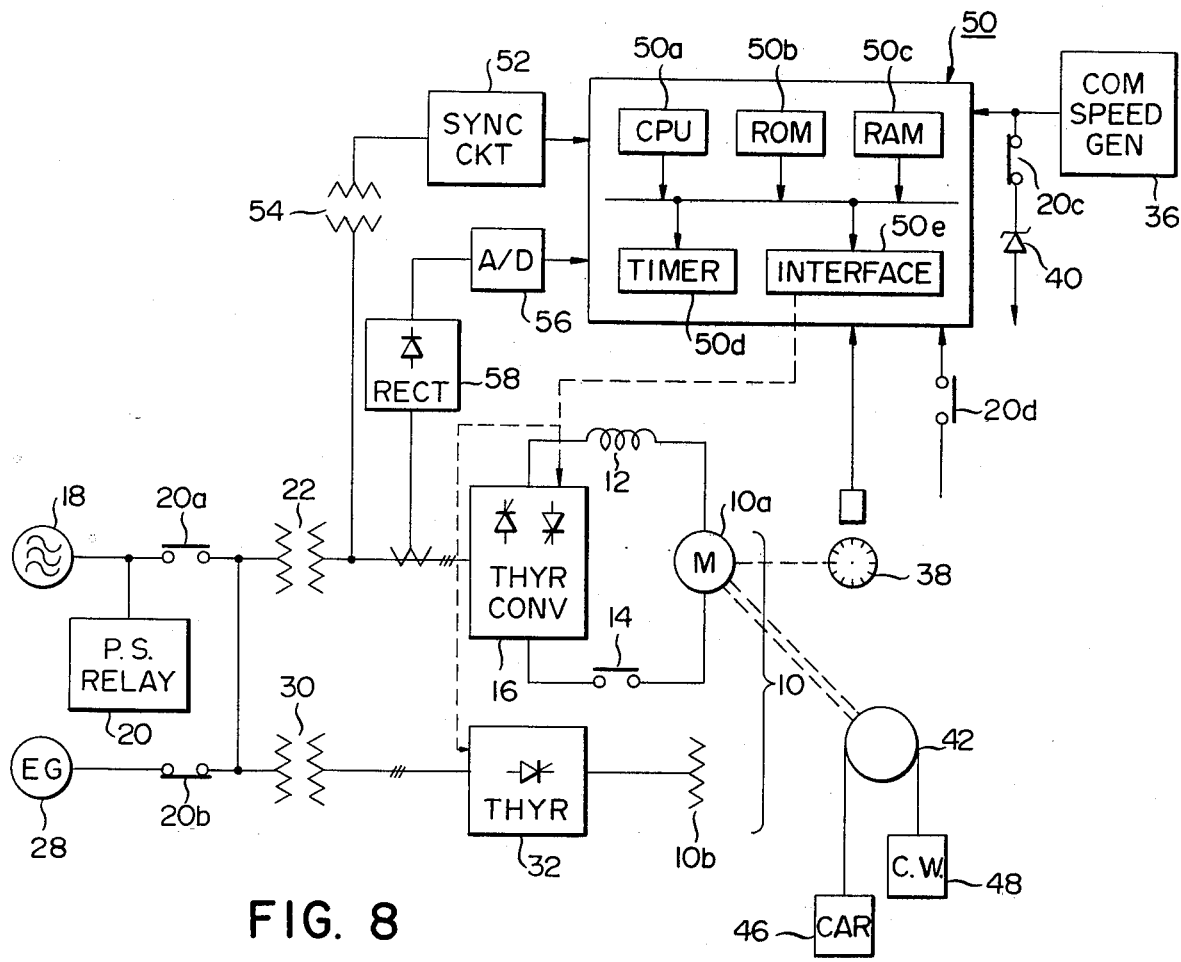
FIG. 8 is a combined block and circuit diagram of one embodiment according to the thyristor Leonard type elevator control system of the present invention illustrated in its operating state in which an emergency AC generator involved serves to drive an associated elevator car.

Referring now to FIG. 8 wherein like reference numerals designate the component identical or corresponding to those shown in FIG. 1, there is illustrated one embodiment according to the thyristor Leonard type elevator control system of the present invention. The arrangement illustrated is different from that shown in FIG. 1 principally in that in FIG. 8 a microcomputer is disposed to control the firing of the thyristor converter arranged in the thyristor Leonard circuit configuration of FIG. 2 for the hoist motor and change the control of the thyristor converter from the symmetric to the unsymmetric mode upon the elevator car traveling by the emergency AC generator.

In the arrangement of FIG. 8 a microcomputer generally designated by the reference numeral 50 includes a central processing unit 50a, a read only memory 50b having stored therein a firing program for controlling the thyristor converter 16 in each of the symmetric and unsymmetric modes, a random access memory 50c for writing and reading out data thereinto and therefrom, a timer 50d and an interface equipment 50e and a bus 50f through which signals required for the firing of the thyristor converter to be controlled are transferred from one to another of the components 50a, 50b, 50c and 50e. The bus 50f is also arranged to receive selectively external inputs and supply them to the central processing unit 50a. Those external inputs involve the command speed signal from the command speed generator 36, that signal chipped by the Zener diode 40, an actual speed signal from a pulse type speed sensor 38 connected to the motor's armature 10a to sense the actual rotational speed of the armature 10a or the motor 16, a synchronizing signal from a synchronizing circuit 52 connected to the three-phase AC source transformer 22 through a coupling three-phase trnasformer 54 to pick up a signal synchronized with the source voltage, and a digital signal from an analog-to-digital converter 56. The analog-to-digital converter 56 is connected to a rectifier 58 subsequently connected to a secondary winding of a three-phase current transformer 60 including a primary winding electromagnetically coupled to the input side of the thyristor converter 16 of the thyristor Leonard circuit configuration as shown in FIG. 2. The current transformer 60 senses a current through that input side and the rectifier 58 rectifies the sensed current. The the analog-to-digital converter 56 converts the rectified current to the digital signal which is, in turn, applied to the bus 50f as described above.

The central processing unit 50a processes the external inputs supplied thereto and delivers the results of the processing, as signals for controlling the firing of the thyristors, to the thyristor converter 16 through the bus 50f.

In FIG. 8 a set of normally open contacts 20d controlled by the power failure detecting relay 20 is shown as being connected to the microcomputer 50. A contact signal from the contact set 20d is supplied via the interface equipment 50e to the central processing unit 50a. When the contact set 20d is in its closed position, the microcomputer 50 is set to control the firing of the thyristor converter 16 in the symmetric mode while the opening of the contact set 20d changes the symmetric mode to the unsymmetric mode.

In the arrangement of FIG. 8 operated with the normal electric source or supplied with an electric power from the three-phase AC source 18, the power failure detecting relay 20 is energized and picked up to close the sets of contacts 20a and 20d and open the sets of contacts 12b and 12c. Therefore the three-phase AC source 18 supplies an electric power to the thyristor converter 16 as in the arrangement of FIG. 1 and simultaneously the microcomputer 50 is set to control the firing of the thyristor converter 16 in the symmetric mode because of the closure of the contact set 20d.

As a result, the microcomputer 50 responds to the command speed signal from the command speed generator 36 to apply firing signals as determined by the results of calculations effected by the central processing unit 50a to the gate electrodes of the thyristors in the thyristor converter 16 in synchronization with the AC source 18 thereby to control the firing of the thyristors in the symmetric mode. Thus the hoist motor 10 is controlled to a rotational speed as determined by the command speed signal to travel the elevator car 46 at its rated speed.

Upon a suspension of the AC power from the three-phase AC source 18, the power failure detecting relay 20 is deenergized and drops out to open the contact sets 20a and 20d and close the contact sets 20b and 20c. The closure of the contact set 20b causes the emergency generator 28 to supply a three-phase AC power to the thyristor converter 16 through the source transformer 22 as in the arrangement of FIG. 1. At the same time, the opening of the contact set 20d causes the microcomputer 50 to be set to control the firing of the thyristor converter 16 the unsymmetric mode. The closure of the contact set 20c causes Zener diode 46 to be connected to the command speed generator 36. Thus the Zener diode 46 clips the command speed signal from the command speed generator 36 to a magnitude less than the rated magnitude. Then the microcomputer 50 calculates similarly the firing control signals in response to the magnitude of the clipped command speed signal and applies the calculated command signals to the gate electrodes of the thyristors in the thyristor converter 16 in synchronization with the source thereby to control the firing of the thyristors in the unsymmetric mode. As a result, the hoist motor 10 is controlled to a rotational speed as determined by the clipped command speed signal to travel the elevator car 46 at a speed less than its rated magnitude.

From the foregoing it is seen that during travel of the elevator car by the emergency AC generator, the present invention is arranged to decrease a command speed signal and simultaneously change the control of the firing of the thyristor converter from the symmetric to the unsymmetric mode. Accoringly an associated load can decrease in capacity in accordance with a decrease in command speed signal and the emergency generator can be easily operated while the resulting power factor is improved. Also as a microcomputer is utilized to change the control of the firing of thyristors from the the symmetric to the unsymmetric mode, the resulting control system can be unexpensive and small-sized because of the elimination of tap changing contactors for the source transformer previously required.

While the present invention has been illustrated and described in conjunction with a single preferred embodiment thereof it is to be understood that numerous changes and modifications may be resorted to without departing from the spirit and scope of the present invention.

What is claimed is:

1. A thyristor Leonard type elevator control system comprising an elevator car, a DC motor for driving said elevator car, a three-phase AC source, a thyristor converter normally connected between said three-phase AC source and said DC motor to convert an AC power from said three-phase AC source to a DC power, an emergency three-phase AC generator, changer means responsive to a suspension of said AC power to change the connection of said thyristor converter from said three-phase AC source to said emergency three-phase AC generator, a command speed generator for generating a command speed signal for said DC motor, command changing means connected to said command speed generator to decrease a magnitude of said command speed signal therefrom in response to the operation of said changer means of connecting said thyristor converter to said emergency three-phase AC generator, and a firing control circuit for connected to both said thyristor converter and said command speed generator to control the firing of said thyristor converter in the symmetric mode in response to said three-phase AC source when said thyristor converter is connected to said three-phase AC source, said firing control circuit sensing the operation of said changer means of connecting said thyristor converter to said emergency three-phase AC generator to control the firing of said thyristor converter in the unsymmetric mode in response to the decreased command signal.

2. A thyristor Leonard type elevator control system as calimed in claim 1 wherein said changer means includes a power failure detecting relay connected to said three-phase AC source and plurality of contact sets controlled by said relay.

3. A thyristor Leonard type elevator control system as claimed in claim 2 wherein said command changing means includes one of said plurality of contact sets connected to said command speed generator and a Zerner diode connected in series to said one contact set.

4. A thyristor Leonard type elevator control system as claimed in claim 1 wherein said firing control circuit includes a read only memory having stored therein firing programs for controlling the firing of said thyristor converter in the symmetric and unsymmetric modes respectively, a central processing unit, a random access memory for writing and reading out data thereinto and therefrom, and an interface equipments.

5. A thyristor Leonard type elevator control system as claimed in claim 1 wherein said firing control circuit is formed of a microcomputer.

* * * * *